3,227,607
METHOD OF ADDING SILICA PIGMENTS TO NEWSPRINT PULP TO IMPROVE INK STRIKE PROPERTIES OF THE NEWSPRINT AND PIGMENT THEREFOR
Robert K. Mays, Havre de Grace, Md., and Nathan Millman and Frank R. Trowbridge, Macon, Ga., assignors to J. M. Huber Corporation, Havre de Grace, Md., a corporation of New Jersey
No Drawing. Filed Oct. 15, 1963, Ser. No. 316,457
5 Claims. (Cl. 162—181)

This invention relates to paper containing novel pigments. More particularly, this invention relates to paper filled or loaded with synthetic finely divided particulate siliceous pigments. Specifically, this invention relates to newsprint and similar light weight publication stocks loaded with synthetic finely divided particulate siliceous pigments which impart improved optical and printing properties to the paper.

The art of adding fillers to various grades of paper goes back to the ancient days of papermaking. In those days, a filler was considered undesirable because it was thought to adulterate the paper. Today, fillers such as clay, calcium sulfate, titanium dioxide, talc, barytes, calcium carbonate, diatomaceous silica, calcium sulfite, calcium silicate, blanc fixe and synthetic sodium alumino silicate are widely used as fillers for variouss grades of paper. The method of filling or loading the paper cannot be considered an adulteration of the paper since, when used in the proper amounts, the pigment used as the filler improves the properties of the paper. Fillers, as a general rule, are highly desirable in printing papers where they increase the brightness, opacity, and improve the surface and printability of the sheet.

Pigments are usually considered to be satisfactory for filling when they have a high degree of whiteness, a high index of refraction, small particle size, low solubility in water, chemical inertness, and low specific gravity. However, recent studies have shown that these criteria alone are not sufficient to predict the performance of a pigment in paper. Only when actually tested can the value of a pigment be determined.

The most sought after fillers for newsprint or other light weight publication stocks are those which improve the optical qualities of the sheet and reduce ink show-through at a relatively low pigment input.

Clay and calcium carbonate have been used, in the past, as fillers for newsprint and light weight publication stocks, however, they have had very little commercial success because functional utility could not be achieved at low additive levels. Also the calcium carbonate is difficult to handle since it is reactive with rosin size and alum and requires special processing techniques.

We have found that by the proper selection of fillers with respect to morphology, particle size, particle shape, surface area, sorptivity, and chemical composition, it is possible to achieve efficient distribution of the filler in the pulp matrix. This results in alterations in the paper void volume as well as the degree and extent of capillarity and capillary interconnections, which in turn control and distribute the penetration and absorption of ink vehicles. This results in improved print responses and noticeable increase in optical effects with no decrease in sheet strength.

It is therefore a primary object of this invention to provide newsprint containing synthetic filler pigments at low additive levels which improve the optical properties and reduce the ink show-through of the sheet to satisfactory levels.

Another object of this invention is to provide light weight publication stocks with good optical properties at a relatively low pigment input.

A further object of this invention is to provide loaded newsprint and light weight publication stocks with good sheet strength.

Other objects and advantages will be apparent from the following specification.

We have discovered that a group of finely divided particulate synthetic siliceous pigments can be used as fillers for newsprint, catalog papers and other light weight publication stocks and impart satisfactory optical and printing properties to the paper at low pigment loadings without significant decrease in sheet strength. These synthetic siliceous pigments are white, amorphous substances.

While many white pigments are known, the siliceous pigments useful in the practice of this invention are unique in that they are characterized by similar morphological characteristics, i.e., they are composed of amorphous, spherical particles. It is the combination of their morphology together with the oil absorption, surface area, particle size, refractive index, and brightness of each pigment which interacts to contribute to the improved optical and printing properties each imparts to paper. The oil absorption to mean particle size ratio is at least 7000, as determined by the use of these values shown in Table II. While the smallest ratio is 7200, the value 7000 is justified since oil absorptions are only accurate to 10%. See "ASTM Standards on Paint, Varnish, Lacquer, and Related Products," 11th edition, 1961, pages 213–15.

The pigments can be described by chemical and/or physical means. For example, a prenucleated sodium alumino silicate of an amorphous, spherical particle shape is prepared by partially neutralizing with acid, usually a strong mineral acid such as sulfuric acid, a sodium silicate with $SiO_2$ to $Na_2O$ mole ratio of about 2.5 to form a stable sodium silicate solution containing colloidal nuclei and with a ratio of from about 2.8 to 10.2, the preferred ratio being from 3.0 to 3.8. Following this preacidification or prenucleation step, the sodium alumino silicate is precipitated by treating the partially neutralized silicate with alum under carefully controlled conditions.

In this case prenucleated is used to define pigments wherein a colloidal nucleus is formed prior to the precipitation of the pigment.

Another suitable pigment is precipitated, amorphous, hydrated silica of fine particle size and spherical particle shape. These silicas are prepared by reacting an alkali metal silicate with an acid that decomposes the silicate. The acid used forms a water-soluble salt with the alkali metal constituent of the silicate; the reaction is carried out by gradually incorporating with the aqueous suspension, an amount of acid sufficient to decompose all the silicate contained in the suspension. In this way, the fine particles of alkali metal silicate in the fluid suspension are completely decomposed to form therein extremely fine particles of hydrated silica precipitate.

A finely divided, particulate, amorphous, hydrated silica can also be produced by treating sodium silicate with an acidic substance such as carbon dioxide, hydrochloric acid or sulphuric acid. If the conditions are controlled closely, a fine particle amorphous, hydrated silica of spherical particle shape results.

A complex siliceous pigment suitable for use in this invention can be produced by mixing an aqueous slurry of hydrated silica such as those previously described with an aqueous slurry of synthetic, precipitated, amorphous sodium alumino silicate pigments such as those disclosed in U.S. Patents 2,739,073 and 2,848,346. The proportions of the two pigments are advantageously in the range of 65–80% silica to 45–20% sodium alumino silicate by weight.

The lightweight publication stocks and newsprint furnishes loaded with the siliceous pigments previously mentioned are those commonly used in commerce today, i.e., those which contain at least 60% groundwood pulp. Advantageously, those which contain from 60 to 85% groundwood pulp and from 40 to 15% chemical pulp are used. The weight of the paper in which the pigments are most effective according to this invention ranges from 15–40 lbs. per 500 sheets of 24" x 36" paper. The preferred and most common range is 22–36 lbs. (24 x 36–500). The pigments can be incorporated into the paper furnished by known methods such as prior to the head box, at the head box, through bubble sprays on the machine or surface applied at the size press to produce from 1 to 6% ash levels with 1.5–4.5% ash level the most effective when compared to prior art pigments.

The following group of examples set forth typical preparations of pigments representative of the type useful in the practice of this invention.

EXAMPLE 1

43.9 gallons of 6.93% sulfuric acid was added at a rate of 1.69 gallons per minute to 250.6 gallons of 2.47 ratio sodium silicate at 80° C. in a reaction vessel. The sodium silicate contained 0.299 lb. $Na_2O$ per gallon. The silicate ratio was thereby raised to 3.30. To this medium 49.6 gallons of alum $(Al_2(SO_4)_3 \cdot 14H_2O)$ containing 129.8 lbs. of $Al_2(SO_4)_3 \cdot 14H_2O$ was added at a rate of 1.49 gallons per minute. The pH of the medium was 5.5 and after fifteen minutes digestion at 80° C. the pH was 5.58. The product was filtered, dried, and ground. It was a finely divided white powder.

EXAMPLE 2

1520 gallons of sodium silicate containing 2.57 moles of $SiO_2$ per 1 mole of $Na_2O$ and containing 2.0 pounds of silicate per gallon were added to 1520 gallons of water at 176° F. 7% dilute sulfuric acid was slowly added to the reaction mass until the pH became 5.7. The reaction was then digested for 15 minutes at 200° F. The pH was then 5.2. A white precipitate was formed. The product was filtered, dried and ground.

EXAMPLE 3

A hydrated silica was formed by utilizing carbon dioxide in place of sulfuric acid in the reaction of Example 2.

EXAMPLE 4

836 pounds of kaolin clay is uniformly dispersed in 831 pounds of water containing 2.1 pounds of tetrasodium pyrophosphate as a dispersing agent.

This dispersion is charged into a lead-lined reaction vessel and 928 pounds of commercial 66° Baumé sulfuric acid containing 93.1% by weight $H_2SO_4$ is added thereto. During addition, the acid is intimately mixed with the clay dispersion and the reaction vessel is brought to and maintained at 100 pounds per square inch gauge and 338° F. for three hours while continuing the mixing. The clay-acid reaction slurry is then cooled and diluted with water to a final volume of 685 gallons.

A separate aqueous solution of sodium silicate is prepared containing 2490 pounds $Na_2O \cdot 2.5SiO_2$ in a total solution volume of 1245 gallons.

930 gallons of 10% by weight sodium sulfate solution is introduced into a 6000-gallon reaction vessel and agitated. The sodium silicate solution is added to the sodium sulfate solution while agitation is continued. The silicate solution is introduced into the reaction vessel at the center parallel to the agitator shaft and a few minutes later the addition of the clay-acid reaction slurry is started. The clay-acid reaction slurry is added at a rate which maintains an alkaline pH in the reaction vessel during the silicate addition interval.

After all the silicate solution is added, the clay-acid reaction slurry addition is continued until the pH of the reaction mass becomes acid. After the clay-acid reaction slurry addition is completed, the reaction slurry is digested with agitation. A reaction mass temperature of 140–160° F. is maintained throughout the precipitation and digestion periods.

A slurry containing 25 pounds of the reaction product is mixed with a slurry containing 75 pounds of the product of Example 2. The mixed pigment was isolated and contained a combination of white pigments comprising 75% hydrated silica and 25% synthetic sodium alumino silicate.

The examples describing methods of preparation of the type of pigments useful in the practice of this invention are not intended to limit the invention to the use of those products prepared by those specific methods since other synthetic white siliceous pigments of similar morphology are operable, no matter how prepared.

In order to illustrate the optical property improvements imparted to newsprint and lightweight publication stocks by these siliceous pigments, tests were run on 8" x 8" handsheets composed of 65% southern groundwood and 35% bleached southern kraft. The basis weight of the stocks was maintained at 32 lbs. (24 x 36–500). Pigment loadings were controlled to produce three ash levels, about 2, 4 and 6% and the sheets were calendered prior to testing.

The following procedure was followed in preparing and testing the handsheets using the following furnish:

| | Percent |
|---|---|
| Semi-bleached groundwood | 65 |
| Bleached kraft | 35 |
| Crystal violet dye | 0.002 |

Alum to pH 4.5.

The bleached kraft was refined to a Canadian freeness of about 475 ml. prior to blending with the groundwood. Sheets were pressed on a Williams press and air dried overnight in 8" x 8" drying frames at 73° F. and 50% relative humidity. The sheets were calendered and evaluated as follows:

(1) *Optical properties*

| | |
|---|---|
| TAPPI brightness | TAPPI Standard Procedure T-452-M-58. |
| TAPPI opacity | TAPPI Standard Procedure T-425-M-60. |

(2) *Printing properties*

The test sheets were printed on the felt side with a Vandercook Universal No. 1 proof press using a solid plate, inked with a high speed news ink. The printed stocks were tested for degree of ink penetration and printing intensity. Both of these properties were determined in accordance with Larocque's equation.

$$\text{Percent printing quality} = 100 - \frac{\text{reflectance of printed surface}}{\text{reflectance of unprinted surface}} \times 100$$

The tests were made on a solid print. The printed side was used to determine the printing or color intensity and the reverse side for measuring the degree of ink penetration. The reflectance measurements were made with a G.E. brightness meter at 457 mm.

The printing tests were made at 73° F. and 50% relative humidity on a Universal No. 1 Vandercook proof press, and a 3.5" x 7" newsprint plate mounted type high. With carriage undercut 4 mils and plate mounted 0.918", carriage and plate will meet in a "kiss" impression. The solid portion of the plate, an area of 3.5" x 3", was used to measure printing properties. The press was adjusted so that all sheets were printed with a 4 mils impression. All sheets were weighed before and after printing.

The printing evaluations were made on an ink pick-up equivalent to 2.0 gms./m.$^2$ for the solid portion. This particular ink pick-up was selected because show-through values obtained with this ink level fell in a range reported by a number of newsprint mills. Other ink pick-up values can be used to give the same relative results.

It was found that approximately 1.75 ml. of ink applied to the ink distribution system produced an ink film equivalent to 2 gms./m.$^2$. However, due to variations in the amount of ink picked up by papers containing various pigments, it was necessary to apply 1.5 ml., 1.75 ml., and 2.0 ml. of ink to the inkwell in order to produce the desired 2 gms./m.$^2$ ink film in all cases.

Another method of comparing the effects of pigments on the optical and printing properties of papers is to print sheets containing different loadings of pigments with sufficient ink to give a black reflectance of 90%, then compare the strike-through values at the various ash levels.

TABLE I.—OPTICAL QUALITIES IMPARTED BY VARIOUS PIGMENTS TO HANDSHEETS

| Pigment | Pigment Properties | | | | |
|---|---|---|---|---|---|
| | Particle Shape | Refractive Index | BET Surface Area (m.$^2$/g.) | Sp. Gr. | TAPPI Brightness, Percent |
| Prenucleated sodium alumino silicate | Amorphous, spherical | 1.51 | 155.7 | 2.1 | 91.0 |
| Hydrated Silica (Example 3) | ----do---- | 1.46 | 136.2 | 1.95 | 90.8 |
| 75% Hydrated Silica, 25% sodium alumino silicate | ----do---- | | 261.2 | 2.0 | 91.2 |
| Hydrated Silica (Example 2) | ----do---- | 1.46 | 132.0 | 1.96 | 94.3 |
| Sodium Alumino Silicate | ----do---- | 1.55 | 54.4 | 2.1 | 93.1 |
| Titanium Dioxide | Tetragonal, (rhombic) | 2.52 | 7.8 | 3.9 | 95 |
| Kaolin Clay | Hexagonal plates | 1.56 | 22 | 2.6 | 74.2 |
| Diatomaceous Silica | Variable skeletal remains marine microorganisms | 1.40–1.49 | 2.2 | 2.1 | 91.3 |
| Unfilled | | | | | |

| Pigment | Sheet Properties | | | | | | | | | |
|---|---|---|---|---|---|---|---|---|---|---|
| | TAPPI Brightness, Percent | | | | | | | TAPPI Opacity, Percent | | |
| | 2% Ash | | 4% Ash | | 6% Ash | | | | | |
| | F.S.[1] | W.S.[2] | F.S. | W.S. | F.S. | W.S. | F.S. | W.S. | 2% Ash | 4% Ash | 6% Ash |
| Prenucleated sodium alumino silicate | 62.5 | 62.5 | 63.8 | 63.9 | 64.8 | 65.0 | | | 88.6 | 89.7 | 90.1 |
| Hydrated Silica (Example 3) | 61.8 | 61.9 | 62.0 | 62.3 | 62.1 | 62.5 | | | 87.8 | 88.4 | 88.6 |
| 75% Hydrated Silica, 25% sodium alumino silicate | 62.1 | 62.1 | 63.0 | 63.1 | 63.7 | 63.8 | | | 87.8 | 88.1 | 88.3 |
| Hydrated Silica (Example 2) | 62.3 | 62.5 | 63.4 | 63.6 | 64.2 | 64.5 | | | 88.4 | 89.1 | 89.4 |
| Sodium Alumino Silicate | 63.3 | 63.4 | 64.9 | 65.3 | 66.2 | 66.6 | | | 88.2 | 89.3 | 90.0 |
| Titanium Dioxide | 63.4 | 63.4 | 65.3 | 65.4 | 66.6 | 66.7 | | | 89.2 | 91.0 | 92.0 |
| Kaolin Clay | 61.8 | 61.9 | 62.2 | 62.5 | 62.4 | 62.8 | | | 87.8 | 88.3 | 88.5 |
| Diatomaceous Silica | 62.3 | 62.3 | 63.0 | 63.2 | 63.3 | 63.4 | | | 87.7 | 88.0 | 88.2 |
| Unfilled | | | | | | | 61.5 | 61.6 | | | | 87.5 |

[1] F.S.=Felt Side.  [2] W.S.=Wire Side.

TABLE II.—PRINTING QUALITIES IMPARTED BY VARIOUS PIGMENTS TO HANDSHEETS

| Pigment | Pigment properties | | Sheet Properties at Ink Pick-up of 2.0 Gms./M.$^2$ | | | | | | |
|---|---|---|---|---|---|---|---|---|---|
| | Oil Absorption, mls./100 gm. | Mean Particle size, microns | Show Through | | | | Printing Intensity | | |
| | | | 2% Ash | 4% Ash | 6% Ash | | 2% Ash | 4% Ash | 6% Ash |
| Prenucleated sodium alumino silicate | 144 | 0.02 | 8.1 | 4.1 | 1.4 | | 83.6 | 83.5 | 83.0 |
| Hydrated Silica (Example 3) | 178 | 0.02 | 7.6 | 4.3 | 2.2 | | 83.2 | 82.7 | 82.4 |
| 75% Hydrated Silica, 25% Sodium Alumino Silicate | 167 | | 8.3 | 4.4 | 2.0 | | 83.4 | 83.5 | 83.3 |
| Hydrated Silica (Example 2) | 189.5 | 0.02 | 6.8 | 3.0 | 1.7 | | 83.1 | 82.9 | 82.8 |
| Sodium Alumino Silicate | 111 | 0.02–0.04 | 8.2 | 5.3 | 3.3 | | 83.4 | 83.1 | 83.0 |
| Titanium Dioxide | 25 | 0.25 | 9.2 | 7.0 | 5.3 | | 84.2 | 83.8 | 83.4 |
| Kaolin Clay | 34 | 0.4 | 9.8 | 8.8 | 8.2 | | 83.8 | 83.8 | 84.1 |
| Diatomaceous Silica | 58 | 1–6 | 11.6 | 11.0 | 9.9 | | 84.2 | 84.4 | 84.5 |
| Unfilled | | | | | | 10.6 | | | | 83.6 |

TABLE III.—STRIKE THROUGH PROPERTIES WITH 90% BLACK REFLECTION

| Percent Ash | Pigment | Strike Through Percent |
| --- | --- | --- |
| 0.5 (control) | None | 81 |
| 2 | Sodium Alumino silicate | 84.7 |
| 2 | Prenucleated Sodium Alumino Silicate | 88.5 |
| 4 | Sodium Alumino Silicate | 89 |
| 4 | Prenucleated Sodium Alumino Silicate | 92.7 |
| 6 | Sodium Alumino Silicate | 92.4 |
| 6 | Prenucleated Sodium Alumino Silicate | 94.4 |
| 0.5 (control) | None | 85 |
| 2 | Hydrated Silica (Example 2) | 89.5 |
| 4 | Hydrated Silica (Example 2) | 92.6 |
| 6 | Hydrated Silica (Example 2) | 94.4 |

The data in Tables I and II indicate that the amorphous spherical synthetic siliceous pigments of the same class with respect to morphology, color, particle size and particle shape exhibit excellent print responses and related paper properties when used in newsprint type furnishes at low additive levels.

Titanium dioxide, because of its high refractive index and opacity imparts good optical properties to the newsprint but has poor strike through properties.

The optical properties imparted to the newsprint by the pigments used in this invention compare favoarbly to the prior art pigments, being generally better than either clay or diatomaceous earth and equivalent to sodium alumino silicate. The printing properties, attributable to the structure of the pigments, are superior to the prior art pigments, particularly the strike through properties. The printing intensity of the pigments while appearing to differ significantly numerically, are in reality insignificant differences to the naked eye.

The strike through properties of the pigments used in this invention, when compared to prior art pigments, at equal black reflectance are significantly superior, indicating that the group of pigments belonging to the class with the particular morphological characteristics are unique in their effect on newsprint. The newsprint and other lightweight publication stocks when loaded with these pigments, overall exhibit superior optical properties and printing properties.

The foregoing is illustrative only and additional modifications may be made without departing from the substance of the invention as defined in the appended claims.

We claim:

1. A method of improving the ink strike through properties of newsprint which comprises adding a filler pigment to an aqueous slurry newsprint pulp in sufficient amounts to result in from 1% to 6% ash, said filler pigment being selected from the group consisting of prenucleated sodium alumino silicate, hydrated silica, and a physical-chemical combination pigment of 25% sodium alumino silicate and 75% hydrated silica, each pigment being a white, amorphous, particulate material with a mean particle size of 0.02 to 0.04 micron, an oil absorption to mean particle size ratio of at least 7000 and a spherical particle shape and then forming a sheet.

2. The method of claim 1 wherein the filler pigment is prenucleated sodium alumino silicate.

3. The method of claim 1 wherein the filler pigment is hydrated silica.

4. The method of claim 1 wherein the filler pigment is a physical-chemical combination pigment of 25% sodium alumino silicate and 75% hydrated silica.

5. A synthetic filler pigment suitable for use in newsprint, comprising a physical-chemical combination of 75% by weight hydrated silica and 25% by weight sodium aluminosilicate, said pigment characterized as being an amorphous, white, particulate material with a mean particle size of from 0.02 to 0.04 micron, an oil absorption to mean particle size ratio of at least 7000 and a spherical particle shape.

References Cited by the Examiner

UNITED STATES PATENTS

| | | | |
| --- | --- | --- | --- |
| 2,739,073 | 3/1956 | Bertorelli | 106—306 |
| 2,918,399 | 12/1959 | Eichmeier | 162—181 |
| 2,935,437 | 5/1960 | Taylor | 162—181 |
| 3,085,861 | 4/1963 | Thornhill et al. | 106—288 |

DONALL H. SYLVESTER, *Primary Examiner.*

S. L. BASHORE, *Assistant Examiner.*